Jan. 5, 1971 R. J. BLACKMAN 3,553,057
FILM CLAMPING AND RETAINING DEVICE
Filed Sept. 27, 1968 3 Sheets-Sheet 1
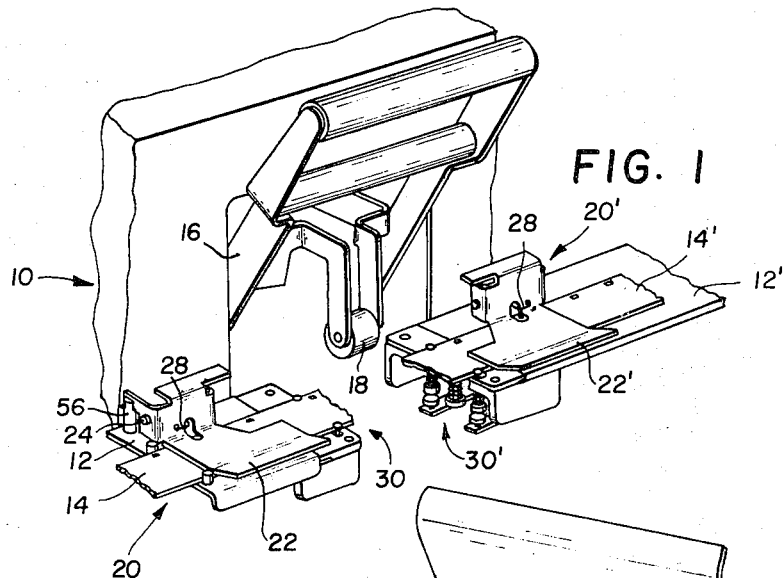
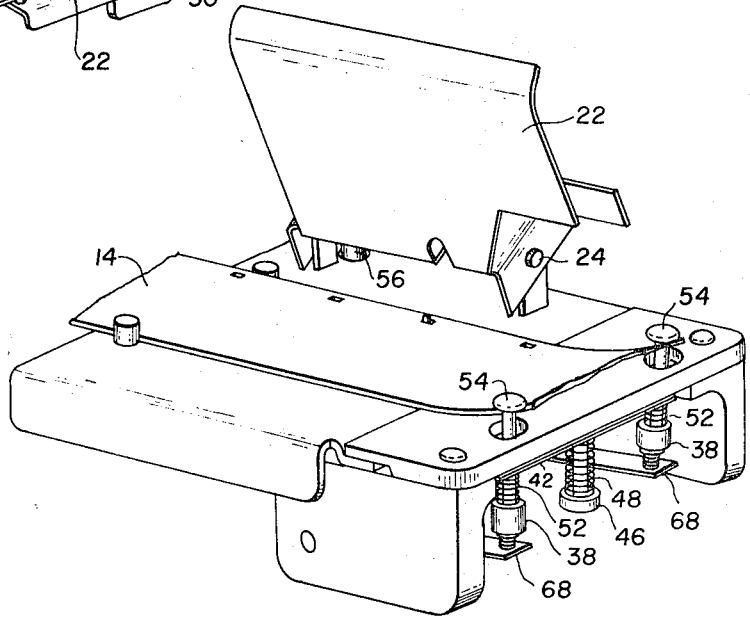
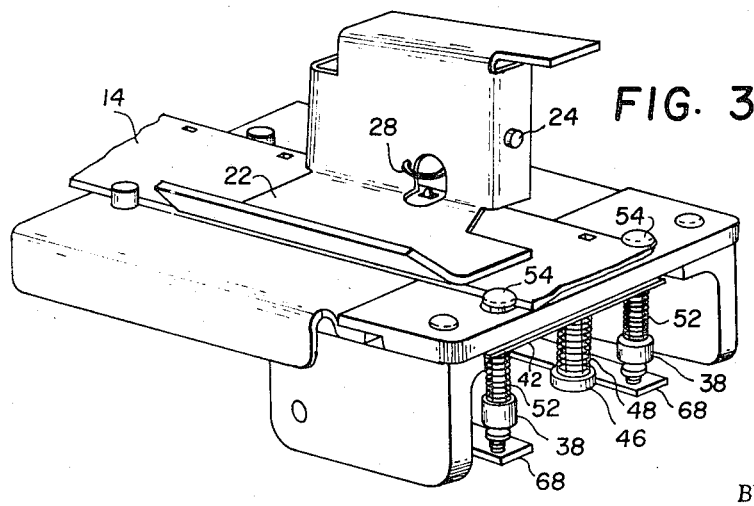
ROBERT M. BLACKMAN
INVENTOR.
ATTORNEYS

ROBERT J. BLACKMAN
INVENTOR.

ATTORNEYS

United States Patent Office 3,553,057
Patented Jan. 5, 1971

3,553,057
FILM CLAMPING AND RETAINING DEVICE
Robert J. Blackman, Rochester, N.Y., assignor to Eastman Kodak Company, Rochester, N.Y., a company of New Jersey
Filed Sept. 27, 1968, Ser. No. 763,231
Int. Cl. B31f 5/00
U.S. Cl. 156—505      10 Claims

ABSTRACT OF THE DISCLOSURE

A film clamping and retaining device for a film splicer or the like in which film retaining pins are movable from a normal inoperative position to a film loading position. After a film strip is loaded in the splicer, the film retaining pins are movable to a film retaining position for releasably holding the film strip to the splicer table. The pins are released for movement to their normal inoperative position by the action of a pressure roller as it rolls over a tape placed on the film end to secure the tape thereto.

BACKGROUND OF THE INVENTION

This invention relates generally to clamping mechanisms, and more specifically to a film clamping and retaining device for a splicer or the like. Splicing mechanisms having film clamping or retaining means for releasably holding the free ends of webs or film strips in aligned, abutting relationship in preparation for splicing are well known in the art. However, problems arise in those situations in which the film ends have a pronounced lateral or longitudinal curl resulting in improper alignment and registration of the film ends. When a film end assumes other than a planar position at a splicing station, it is difficult to apply a tape over the film end, and this situation is aggravated where abutting film ends are involved and the degree of curl is different for each of the film ends.

SUMMARY OF THE INVENTION

This invention includes within its scope a film clamping and retaining device for a film splicing mechanism or the like for preferably retaining a curled end of a web or film strip in a planar position. The film clamping and retaining device comprises one or more pins movable from a normal inoperative position to a film loading position to permit loading of a film onto a table of the splicer, and then movable to a film retaining position in which a flange on the pin clamps the edge of the film to the table. After a splicing tape is placed over the end of the film, the film is released from the film retaining pin by a laterally movable pressure roller which, during the splicing operation, engages the pin and moves the pin clear of the film. The pin is returned by spring means to its normal inoperative position.

One of the objects of the present invention is to provide a film clamping and retaining device for releasably holding a film in a substantially planar position in preparation for splicing.

Another object of the invention is to provide a film clamping and retaining device that is of simple design and construction, thoroughly reliable and efficient in operation, and economical to manufacture.

Objects and advantages other than those set forth above will be apparent from the following description when read in connection with the accompanying drawings.

BRIEF DESCRIPTION OF THE DRAWINGS

In the drawings:
FIG. 1 is a segmental perspective view of a splicing device in which the film clamping and retaining device of this invention is embodied;
FIG. 2 is an enlarged segmental view of a film clamping and retaining device of FIG. 1 shown in a film loading position;
FIG. 3 is a view similar to FIG. 2 showing the film clamping and retaining device in a film clamping position.

DESCRIPTION OF THE PREFERRED EMBODIMENT

Figure 4:
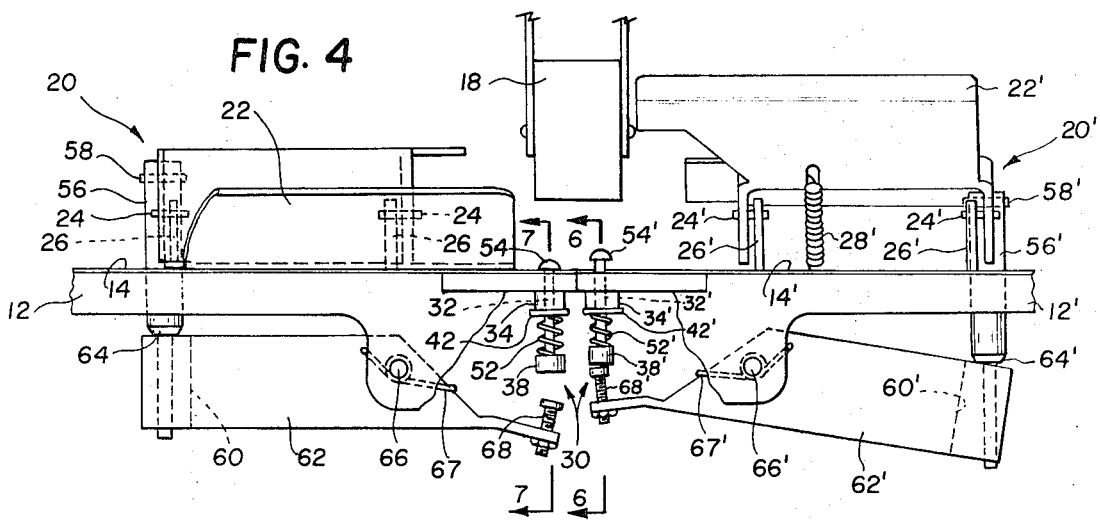
FIG. 4 is a segmental, side elevational view of the film splicer.

Referring to the drawings, a film splicing mechanism 10 is shown having a pair of tables 12, 12' for supporting the ends of two film strips 14, 14', the tables being reciprocally movable for bringing the film ends into abutting relationship for splicing as best seen in FIG. 4. A carriage 16 shown in part for normally supporting a knife mechanism, a tape dispenser and a pressure roller 18 is mounted by any suitable means for reciprocal movement in a direction perpendicular to movement of the aforementioned tables 12, 12' as denoted by the arrow in FIG. 1. A tape-roll carriage, not shown, reciprocates within the knife carriage 16 for stripping the tape from the roll and placing the tape over the film ends. A splicing mechanism of the general type referred to is disclosed and described in detail in U.S. patent application Ser. No. 662,685 filed on Aug. 23, 1967 by Messrs. Robert E. Poole and Donald J. Arganbright entitled "Strip Splicing Device." In view of the fact that the present invention is directed to a film clamping and retaining device which is incorporated in the film splicing mechanism 10, a more complete description of the splicing mechanism in this application is not deemed necessary.

Each of the tables 12, 12' is provided with a film clamping and retaining device for clamping a film strip thereto. Although a pair of tables and film clamping and retaining devices are shown, it should be understood that this invention is also applicable to a splicing mechanism having a single table and film clamping and retaining device. In view of the substantially identical construction except for the left and right hand orientation of the film clamping and retaining devices and the identical mode of operation of the film clamping and retaining devices for simplicity of description, only one of such devices will be described and denoted by numerals, and similar parts of any corresponding devices or mechanisms will be denoted in the drawing and description by the same numerals primed.

A film clamping mechanism 20 of the film clamping and retaining device comprises a film clamping plate member 22 pivotally mounted on stub shaft 24 (see FIG. 4) supported by upwardly extending posts 26 secured to table 12. Over-center spring 28, of which the corresponding spring 28' is shown in detail in FIG. 4, has one end secured to table 12 and its other end secured to film clamping plate member 22 for holding the film clamping member in either a film unclamping position as best seen in FIGS. 2 and 4 to permit loading a film on the table, or in a film clamping position as best seen in FIGS. 1 and 3 for clamping the film on the table.

Figure 5:
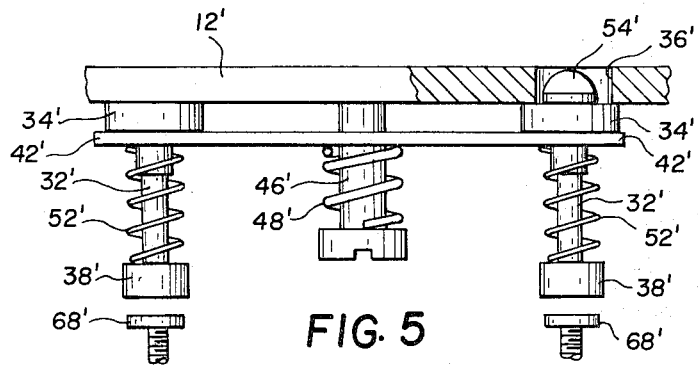
FIG. 5 is a segmental view partially in section showing pins of the film retaining mechanism in a normal inoperative position.

A film retaining mechanism 30 of the film clamping and retaining device for retaining a film or web, and preferably a curled end thereof, in a planar position on a splicer table is provided for each of the tables 12, 12' for cooperation with a corresponding film clamping plate member 22. The film retaining mechanism 30 comprises a pair of film retaining pins 32 supported by table 12. Pins 32 (see FIG. 6) exend through bores in bushings 34 which are interposed between elongated slots 36 in table 12 and inverted cup-shaped washers 38 which are held on pins 32 by retaining rings 40. The bushings 34 are laterally interconnected by a plate 42 having slotted openings 44 at each end through which portions of bushings 34 extend. The plate 42 is connected to table 12 by bolt 46. Spring 48, which is interposed between plate 42 and the head of bolt 46 urges the plate into engagement with shoulders 50 on bushings 34. Springs 52 are interposed between plate 42 and washers 38 for urging pins 32 into a normal inoperative position as seen in FIG. 5, in which pin heads 54 are recessed in slots 36. By virtue of elongated slots 36 in table 12, and slots 44 in plate 42, the pair of pins 32 may be adjustably moved laterally to vary the distance therebetween to accommodate and guide a film, but cannot be moved longitudinally or in the direction of the film strip.

A linkage for operatively interconnecting a film clamping mechanism 20 to a corresponding film retaining mechanism 30 comprises a rod 56 supported by table 12 for reciprocal movement. Rod 56 has one end pivotally connected at 58 to film clamping plate member 22, and its opposite end insertable through a slot 60 in one end of a lifting lever 62. Rod 56 further has a shoulder 64 engageable with lever 62. The lifting lever 62 is pivotally mounted on table 12 at 66, and biased into engagement with shoulder 64 by a spring 67. Lever 62 further has a pair of adjustable lifting studs 68 secured to the other end thereof corresponding to and in alignment with film retaining pins 32.

Figure 6:
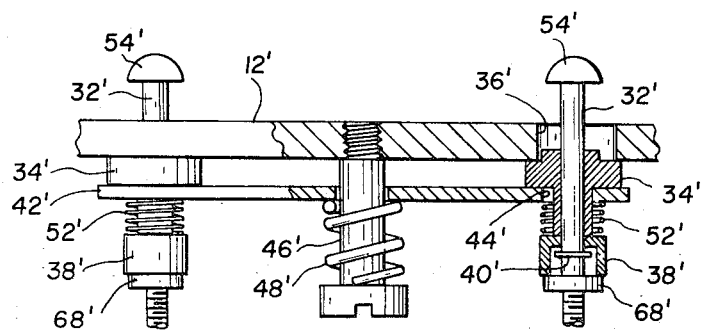
FIG. 6 is an enlarged segmental view in section taken along line 6—6 of FIG. 4.
Figure 7:
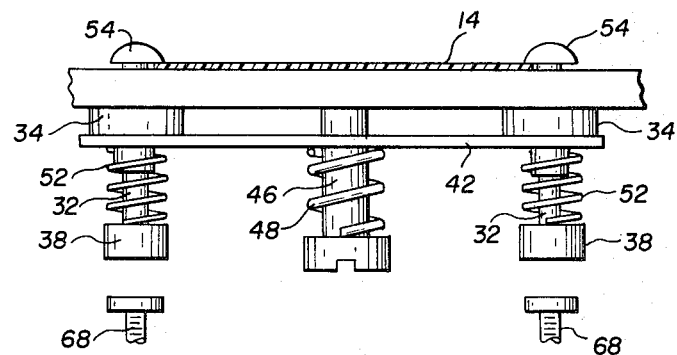
FIG. 7 is an enlarged segmental view taken along line 7—7 of FIG. 4.
Figure 8:
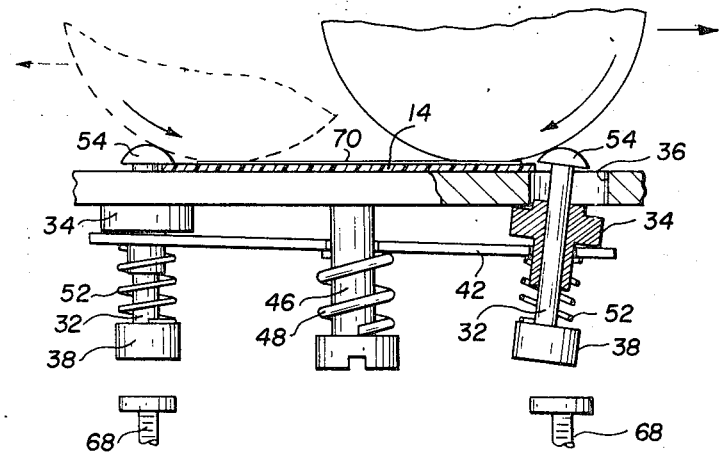
FIG. 8 is a segmental view similar to FIG. 7 showing one of the film retaining pins moved by the tape roller during the splicing operation to release the film.

In the operation of this invention, when film clamping plate members 22, 22' are manually moved to their film unclamping positions as seen in FIGS. 4 and 6, the lifting studs 68, 68' engage the ends of pins 32, 32', and urge the pins against the bias of springs 52, 52' into their film loading positions. After films 14, 14' to be spliced are placed on tables 12, 12' the film clamping plate members 22, 22' are manually moved to their film clamping positions causing the lifting studs 68, 68' to release pins 32, 32'. Springs 52, 52' force a portion of flanges 55, 55' of pin heads 54, 54' respectively into engagement with the film edges to retain the film edges to tables 12, 12' as seen in FIG. 7. The film ends are trimmed off, the tables 12, 12' moved together into the splicing position as seen in FIG. 4, and a piece of splicing tape 70 placed by any suitable means over the ends of the aligned film strips. Reciprocal movement of tape roller 18 over tape 70 starting near the midpoint of tape 70 splices the ends of film strips 14, 14' together in a known manner. Continued movement of tape roller 18 in one direction and then in the opposite direction at each end of tape 70 causes the tape roller to engage pin heads 54, 54' and urge the pins laterally as seen in FIG. 8 to release the film strips. The film clamping plate members 22, 22' may then be manually moved into their film unclamping positions, and the film strips which have ben spliced together removed from splicing device 10.

The invention has been described in detail with particular reference to a preferred embodiment thereof, but it will be understood that variations and modifications can be effected within the spirit and scope of the invention as described hereinabove.

I claim:

1. In a film retaining mechanism, the combination comprising:
    film support means for a film;
    means movable between a film retaining position for retaining an edge of said film on said support means, and a film releasing position; and
    film splicing means for splicing a tape to said film and for moving said film retaining means to said film releasing position during the tape-splicing operation.

2. The invention according to claim 1 wherein said film splicing means comprises a pressure roller movable over said tape on said film and adapted to engage and move said film retaining means to its film releasing position.

3. The invention according to claim 1 wherein said film retaining means comprises a film engaging member movable between film retaining and film releasing positions, a spring for urging said film engaging member into its film retaining position for retaining the film on said support means, and said film splicing means comprises a pressure roller movable over said tape to splice said tape to said film and adapted to engage and move said film engaging member into its film releasing position.

4. The invention according to claim 3 wherein said film engaging member comprises a pin having a film engaging flange.

5. In a film clamping and retaining device, the combination comprising:
    film support means;
    means movable from an unclamping position to a clamping position for clamping a film on said support means; and
    means responsive to said clamping means when moved to said clamping position for retaining an edge of the film on said support means.

6. The invention according to claim 5 wherein said film retaining means comprises a film engaging flange, and a spring for urging said flange and film into engagement with said support means.

7. The invention according to claim 5 wherein said retaining means comprises a pin carried by said support means, a film engaging flange on said pin, and a spring for urging said flange and film edge into engagement with said support means.

8. The invention according to claim 5 wherein said retaining means comprises a film engaging member movable between film retaining and film loading positions, a spring for urging said film engaging member into its film retaining position for retaining the film on said support means, and linkage means interposed between said clamping means and said retaining means for urging said film engaging member to its film loading position when said film clamping means is moved to its film unclamping position.

9. In a film clamping and retaining device, the combination comprising:
    film support means;
    means movable from an unclamping position to a clamping position for clamping a film on said support means;
    means responsive to said clamping means when moved to said clamping position for retaining an edge of said film on said support means, said film retaining means being movable to a film releasing position; and
    film splicing means for splicing a tape onto the film and for moving said film retaining means to said film releasing position during the tape-splicing operation.

10. The invention according to claim 9 wherein said film retaining means comprises a film engaging member movable between film retaining and film releasing positions, a spring for urging said film engaging member into its film retaining position for retaining the film on said support means, and said film splicing means comprises a pressure roller movable over a tape placed on said film to splice said tape thereto, and to engage and move said film engaging member to its film releasing position.

References Cited

UNITED STATES PATENTS 2,080,046  5/1967  Hughey _____ 156—505
3,450,589  6/1969  Jorgensen _____ 156—505

ROBERT F. STAHL, Primary Examiner